United States Patent [19]

Weil

[11] 3,855,365
[45] Dec. 17, 1974

[54] HALOBENZYLPHENYL PHOSPHATES

[75] Inventor: Edward D. Weil, Hastings-on-Hudson, N.Y.

[73] Assignee: Stauffer Chemical Company, Westport, Conn.

[22] Filed: Sept. 18, 1972

[21] Appl. No.: 289,921

Related U.S. Application Data

[63] Continuation of Ser. No. 13,783, June 27, 1972, abandoned.

[52] U.S. Cl. ............... 260/966, 252/49.9, 260/968, 260/973, 260/974, 260/975
[51] Int. Cl. .............................................. C07f 9/12
[58] Field of Search .................................. 260/966

[56] References Cited
UNITED STATES PATENTS

| | | | |
|---|---|---|---|
| 2,225,285 | 12/1940 | Moyle | 260/966 |
| 3,428,714 | 2/1969 | Sconce et al. | 260/966 |

*Primary Examiner*—Lorraine A. Weinberger
*Assistant Examiner*—Richard L. Raymond

[57] ABSTRACT

Novel halobenzylphenyl phosphates having the structure:

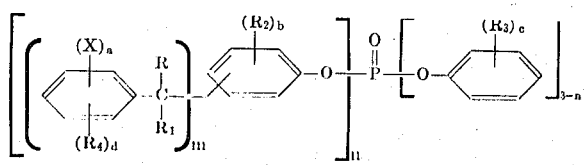

wherein n is a number between 0.5 and 2 inclusive, m is a number between 1 and 3 inclusive, X is a halogen selected from the group consisting of bromine and chlorine, R and $R_1$ are each hydrogen or methyl, $R_2$ and $R_3$ are each lower alkyl having from about 1 to 8 carbon atoms, a is a number between 1 and 5 inclusive, b is a number between 0 and 4 inclusive, c and d are numbers between 0 and 5 inclusive, $R_4$ is an alkyl group having from 1 to about 8 carbon atoms or a benzyl group having the structure corresponding to the formula:

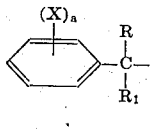

where R, $R_1$, X and a are as described above, are disclosed. These compounds are useful as functional fluids for hydraulic systems, and also exhibit biological activity.

13 Claims, No Drawings

HALOBENZYLPHENYL PHOSPHATES

CROSS-REFERENCE TO RELATED APPLICATION

This application is a continuation of application Ser. No. 13,783, filed June 27, 1972 and now abandoned.

BACKGROUND OF THE INVENTION

Functional fluids suitable for the operation of hydraulic mechanisms require a combination of properties which are often unattainable in many presently available materials. The properties which are required for safe and satisfactory low temperature operation include a low pour point which permits a hydraulic fluid to operate at a low temperature. Another important property which is desirable in hydraulic fluids is a flat viscosity temperature curve, that is, a high viscosity index, which allows the fluid to remain operable over a wide range of temperatures. One of the vital properties which is required for hydraulic fluids which are to be utilized in either commercial industry, mining or military use is minimum flammability. Other desirable qualities for such products include a relatively low oxidation susceptibility, high boiling point, hydrolytic stability and low corrosion characteristics.

It is known that the viscosity index of hydraulic fluids normally decreases when they contain an increasing proportion of cyclic structures (ref. Murphy et al., Industrial & Engineering Chemistry, 42,2415; 2415; Bried et al., Industrial & Engineering Chemistry, 45,484 and refs. cited therein). Therefore, aromatic compounds are usually poor choices for hydraulic fluids. It is also known that increased flame retardancy in hydraulic fluids can be achieved by using halogenated compounds, particularly those containing chlorine or bromine. However, the hydrolytic stability of these compounds decreases with increasing halogenation thereby limiting their applicability as hydraulic fluid. Accordingly, it is understandable that the known halogenated aryl phosphates have met with little or no success as functional fluids.

Thus, it is the prime object of this invention to provide functional fluid compositions which have all the above described properties ordinarily required for their successful utilization.

It is a further object of this invention to provide functional fluid compositions which have enhanced flame resistance without exhibiting any loss of hydrolytic stability.

Technical Disclosure of the Invention

These stated objects are realized by employing as hydraulic fluids new compositions of matter which have a structure corresponding to the formula:

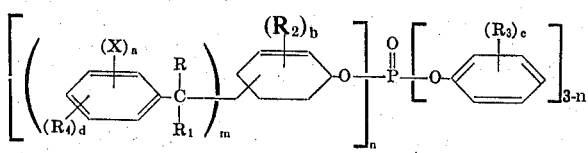

where $n$ is a number between 0.5 and 2 inclusive, $m$ is a number between 1 and 3 inclusive, X is a halogen selected from the class consisting of bromine and chlorine, R and $R_1$ are hydrogen or methyl, $R_2$ and $R_3$ are lower alkyl having from about 1 to 8 carbon atoms, $a$ is a number between and $d$ are numbers between 1 and 5 inclusive, $b$ is a number between 0 and 4 inclusive, $c$ and $d$ are numbers between 0 and 5 inclusive, and $R_4$ is an alkyl having from 1 to about 8 carbon atoms or a benzyl group having the structure corresponding to the formula:

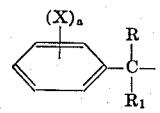

where R, $R_1$, X and $a$ are as described above.

These compounds are generically known as halobenzylphenyl phosphates and include:
2-chlorobenzylphenyl diphenyl phosphate
4-chlorobenzylphenyl diphenyl phosphate
bis (4-chlorobenzylphenyl) phenyl phosphate
2-bromobenzylphenyl diphenyl phosphate
4-bromobenzylphenyl diphenyl phosphate
2,4-dichlorobenzylphenyl diphenyl phosphate
bis (2,4-dichlorobenzylphenyl) phenyl phosphate
2,3-dichlorobenzylphenyl diphenyl phosphate
bis (2-3-dichlorobenzylphenyl) phenyl phosphate
2,5-dichlorobenzylphenyl diphenyl phosphate
bis (2,5-dichlorobenzylphenyl) phenyl phosphate
3,4-dibromobenzylphenyl diphenyl phosphate
bis (3,4-dichlorobenzylphenyl) phenyl phosphate
26-dichlorobenzylphenyl diphenyl phosphate
bis (2-6-dibromobenzylphenyl) phenyl phosphate
2,4-dibromobenzylphenyl diphenyl phosphate
bis (2,4-dibromobenzylphenyl) phenyl phosphate
pentachlorobenzylphenyl diphenyl phosphate
bis (pentachlorobenzylphenyl) phenyl phosphate
α-methyl-3-chlorobenzylphenyl diphenyl phosphate
bis (α-methyl-3-chlorobenzylphenyl) phenyl phosphate
α-methyl-2-chlorobenzylphenyl diphenyl phosphate
bis (α-methyl-2-chlorobenzylphenyl) phenyl phosphate
α-methyl-2,5-dichlorobenzylphenyl diphenyl phosphate
bis (α-methyl-2,5-dichlorobenzylphenyl) phenyl phosphate
2,3,6-trichlorobenzylphenyl diphenyl phosphate
bis (2,3,6-trichlorobenzylphenyl) phenyl phosphate
2,4,5-trichlorobenzylphenyl diphenyl phosphate
bis (2,4,5-trichlorobenzylphenyl) phenyl phosphate
2,3,4-trichlorobenzylphenyl diphenyl phosphate
bis (2,3,4-trichlorobenzylphenyl) phenyl phosphate
α-methyl-2,3,6-trichlorobenzylphenyl diphenyl phosphate
bis (α-methyl-2,3,6-trichlorobenzylphenyl) phenyl phosphate
α-methyl-2,4,5-trichlorobenzylphenyl diphenyl phosphate
bis (α-methyl-2,4,5-trichlorobenzylphenyl) phenyl phosphate
α-methyl-2,3,4-trichlorobenzylphenyl diphenyl phosphate
bis (α-methyl-2,3,4-trichlorobenzylphenyl) phenyl phosphate
α-methyl-pentachlorobenzylphenyl diphenyl phosphate bis (α-methyl-pentabromobenzylphenyl) phenyl phosphate
chlorobenzylphenyl ditolyl phosphate
bis (chlorobenzylphenyl) tolyl phosphate
chlorobenzylphenyl dixylyl phosphate
bis (chlorobenzylphenyl) xylyl phosphate
chlorobenzylphenyl dinonylphenyl phosphate
bis (chlorobenzylphenyl) nonylphenyl phosphate
α-methyl-chlorobenzylphenyl ditolyl phosphate
bis (α-methyl-chlorobenzylphenyl) tolyl phosphate
dichlorobenzylphenyl dixylyl phosphate
bis(dichlorobenzylphenyl) xylyl phosphate
α-methyl-chlorobenzylphenyl dixylyl phosphate
α-methyl-chlorobenzylphenyl dinonylphenyl phosphate
α-methyl-chlorobenzyl-4-cresyl diphenyl phosphate
2,4 di(α-methyl-4-chlorobenzyl) phenyl diphenyl phosphate
3,4 di (α-methyl-4-chlorobenzyl) phenyl diphenyl phosphate
α-methyl-4-chlorobenzylphenyl bis(4-isopropylphenyl phosphate
bis (α-methyl-4-chlorobenzylphenyl) 4-isopropylphenyl phosphate
α, α-dimethyl-4-chlorobenzylphenyl diphenyl phosphate
the isomers of the bis (chlorobenzyl-chlorobenzylphenyl) phenyl phosphates and the like.

The preferred compounds of the present invention are those in which R is hydrogen and $R_1$ is methyl or hydrogen, that is, the benzyl and α-methyl benzyl series. Particularly preferred are the:
chlorobenzylphenyl diphenyl phosphate
dichlorobenzylphenyl diphenyl phosphate
trichlorobenzylphenyl diphenyl phosphate
bis (chlorobenzylphenyl) phenyl phosphate
bis (dichlorobenzylphenyl) phenyl phosphate
bis (trichlorobenzylphenyl) phenyl phosphate
α-methyl-chlorobenzylphenyl diphenyl phosphate
bis (αmethyl-chlorobenzylphenyl) phenyl phosphate dichlorobenzylphenyl bis(isopropylphenyl) phosphate
bis (dichlorobenzylphenyl) isopropylphenyl phosphate
α-methyl-chlorobenzylphenyl bis(isopropylphenyl) phosphate
bis (α-methyl-chlorobenzylphenyl) isopropylphenyl phosphate
and the bromine analogs of these compounds.

The compounds of the present invention can be produced by two methods. The first method comprises:
a. reacting a substituted phenolic compound, wherein the substituent is a halobenzyl or α-alkyl-halobenzyl group, with a phosphorus oxyhalide, and (b) reacting the product resulting from step (a) with another phenolic compound so as to obtain the desired halobenzylphenyl phosphate. The phenolic compound employed in step (a) should have a structure corresponding to the formula:

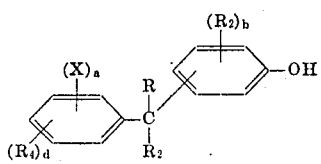

where X, a, b, R, $R_1$, $R_2$, $R_4$, d and m are the same as defined above. This phenolic compound is reacted in a molar ratio of 1 to 2 moles of phenol per mole of oxyhalide, depending upon the final product desired. The phosphorus oxyhalide is preferably phosphorus oxychloride or phosphorus oxybromide. The product resulting from step (a) is reacted with another phenolic compound having a structure corresponding to the formula:

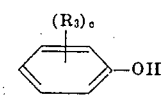

where $R_3$ and c are as previously defined. The molar ratio of the second phenolic compound to the phosphorus oxyhalide is normally such that the proportion of the total concentration of both phenolic compounds, that is, the phenolic compound of steps (a) and (b), to the oxyhalide is 3 to 1. Steps (a) and (b) can also be carried out simultaneously. This process can be carried out over a wide temperature range from about 30° to about 250°C. The reaction rate can be increased by employing a catalytic amount of a metallic halide such as magnesium chloride, titanium tetrachloride, aluminum chloride, or zinc chloride.

The second process which can, if desired, be used for the preparation of the compositions of the present invention, is outlined in copending application, Ser. No. 13,780, filed Feb. 24, 1970 and now U.S. Pat. No. 3,697,628 and comprises reacting a halobenzyl halide of the formula:

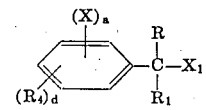

where X, a, d, $R_4$, R and $R_1$ are as previously defined and $X_1$ is a halogen, with a triaryl phosphate in the presence of a Lewis acid catalyst. The halobenzyl halides are employed in a ratio of from 1 to 3 moles per mole of phosphate. Applicable halobenzyl halides include chlorobenzyl chloride, dichlorobenzyl chloride, trichlorobenzyl chloride, tetrachlorobenzyl chloride, pentachlorobenzyl chloride, bromobenzyl chloride, dibromobenzyl bromide and α-methyl chlorobenzyl chloride. Suitable triaryl phosphates include triphenylphosphate and the lower alkyl substituted derivatives thereof. The term "Lewis acid" catalyst is meant to designate those inorganic compounds which are strong electron pair acceptors. These catalysts are well known in the art and can be illustrated by ferric chloride, aluminum chloride, zinc chloride, molybdenum pentachloride, titanium tetrachloride, antimony trichloride, antimony pentachloride, tin tetrachloride and boron trifluoride. These catalysts are employed in amounts from about 0.01 to about 5.0 percent by weight of the entire reaction mixture. The reaction is normally run at temperatures in the range from about 100° to about 250°C. for a period of from about ½ to 48 hours, and preferably from about 2 to about 24 hours.

The compounds of the present invention are characterized by their unusually high viscosity index, flame retardancy, hydrolytic stability and oxidative stability. As explained hereinabove, it would normally be expected that these compounds would have low viscosity indices due to their high proportion of cyclic structures. However, these compounds surprisingly exhibit viscosity indices which are considerably higher than expected.

One of the most beneficial and surprising characteristics of the halobenzylphenyl phenyl phosphates of the present invention is their high degree of flame retardancy which is attained without any consequential loss of hydrolytic stability. The halophenyl phosphates are known in the art as plasticizers having a good flame retardancy but poor hydrolytic stability. It is believed that this difference is due to the fact that the halophenyl phosphates have their halogen substituents attached to their respective phenyl groups which are adjacent to the ester linkage and thereby give that linkage an anhydride character, whereas the halogen substituents in the compounds of the present invention are attached to their benzyl groups and do not interfere with the ester linkage. It is believed that this positioning of the halogen substituents gives the compounds of the present invention their superior hydrolytic stability and makes them far more suitable for use as functional fluids. However, this theory is put forth only as a possible explanation and the invention is not to be limited thereto.

The halobenzylphenyl phosphates of the present invention can be used individually or blended together to obtain a fluid having properties which are intermediate between the thus blended phosphates. These compounds can also be blended with other functional fluids or, for economic reasons, they can be blended with less costly petroleum oils and/or polychloroaromatic compounds, particularly the polychlorobenzenes and polychlorobiphenyls. The functional fluids of the present invention can also contain anticorrosion agents, defoamers and various load bearing additives all of which are well known and described in the literature.

The present invention is further illustrated by the following examples:

EXAMPLE 1

An equimolar mixture of a commercially available mixture of dichlorobenzyl chloride isomers and triphenyl phosphate is prepared by mixing 195 grams of commercial mixed isomers of dichlorobenzyl chloride with 326 grams of triphenyl phosphate in a vessel fitted with a thermometer and stirrer. To this is added 1 gram of ferric chloride. The reactant mixture is heated to 180° – 200°C. for eight hours, at which time substantially one mole of hydrogen chloride has been evolved and collected in a water filled trap. The liquid product is purified by washing with 2 percent sodium hydroxide, then with water and finally stripping to 100°C. at 1 millimeter pressure. The resulting product is shown by elemental analysis to have an average structure corresponding to dichlorobenzylphenyl diphenyl phosphate. Nuclear magnetic resonance and mass spectroscopy indicate the product to be a mixture of triphenyl phosphates having from 0 to 7 dichlorobenzyl groups per phosphate group.

EXAMPLE 2

By means of the procedure described in Example 1, 230 grams of trichlorobenzylchloride is mixed with 369 grams of phenyl bis(isopropylphenyl) phosphate and 5 grams of molybdenum pentachloride. The reactant mixture is heated to 160°-175°C. for 8 hours. The major component of the reaction product is shown by nuclear magnetic resonance and mass spectroscopy to be trichlorobenzylphenyl bis(isopropylphenyl) phosphate.

EXAMPLE 3

Using the procedure of Example 1, 297 grams of pentachlorobenzyl chloride is mixed with 326 grams of triphenyl phosphate and 6 grams of zinc chloride. The reactant mixture is heated to 180°-220°C. for 18 hours, yielding a reaction product in which the major component is pentachlorobenzylphenyl diphenyl phosphate.

EXAMPLE 4

Using the procedure of Example 1, 411 grams of bromobenzyl chloride is mixed with 326 grams of triphenyl phosphate and 7 grams of molybdenum pentachloride. The reactants are heated to 160°-180°C. for 2 hours, yielding a mixture of bromobenzylated triphenyl phosphates. The largest portion of the product is bis(bromobenzylphenyl) phenyl phosphate.

EXAMPLE 5

A reaction vessel fitted with a reflux condenser, thermometer and stirrer is charged with 378 grams of phosphorus oxychloride. To this is added, with stirring, 116 grams of alpha-methyl-chlorobenzylphenol isomers and 4 grams of anhydrous magnesium chloride. The reaction mixture is heated to reflux at 110°C. until one-half mole of hydrogen chloride evolves. Excess phosphorus oxychloride is stripped off and the product is distilled at 136°C. and 0.02 millimeters of absolute pressure. The phosphorodichloridate produced is then added to 84 grams of hot phenol in a flask. Addition of 1 gram of magnesium chloride initiates the evolution of hydrogen chloride. The reactants are heated to 140°-150°C. until 1 mole of hydrogen chloride evolves. The reaction mixture is stripped as above. Nuclear magnetic resonance and mass spectroscopy show the residue to be an isomeric mixture of alpha-methyl-chlorobenzylphenyl diphenyl phosphate.

EXAMPLE 6

The procedure of Example 5 is repeated with the exception that 232 grams of alpha-methyl chlorobenzylphenol isomers is employed and the refluxing is allowed to continue until 1 mole of hydrogen chloride is evolved. The product obtained in this case is bis(alpha-methyl-chlorobenzylphenyl) phenyl phosphate.

EXAMPLE 7

The procedure of Example 5 is repeated with the exception that 126 grams of technical grade isopropylphenol is substituted for the hot phenol in the second step. The product is shown to be alpha-methyl-chlorobenzylphenyl bis(isopropylphenyl) phosphate.

EXAMPLE 8

The dichlorobenzylphenyl diphenyl phosphate, produced by the procedure of Example 1, when compared with a commercially available triaryl phosphate functional fluid sold under the name of FYRQUEL 550 by Stauffer Chemical Company of New York gives the following results:

Table I

| Properties | Dichloro-benzylphenyl diphenyl phosphate | FYRQUEL 550 |
| --- | --- | --- |
| Viscosity (in Saybolt Universal Seconds) | | |
| at 100°F. | 651.6 | 556.8 |
| at 210°F. | 56.16 | 47.47 |
| Viscosity Index | −4.9 | −30 |
| Autoignition Temperature (°F.) | 1320 | 1130 |
| Oxidative Stability (viscosity, SUS at 100°F.) | | |
| 0 hrs. | 651.6 | 556.8 |
| 24 hrs. | 737.6 | 624.8 |
| 48 hrs. | 766.1 | 660.4 |
| 72 hrs. | 805.5 | 708.4 |
| 96 hrs. | 837.0 | 750.3 |
| Change in Viscosity % | 28.4 | 34.8 |

The superiority of the halobenzylphenyl phosphate in autoignition temperature, viscosity index and stability is evident from Table I. The product of Example 1 is also found to be far superior to dichlorophenyl diphenyl phosphate in hydrolytic stability.

What is claimed is:

1. Halobenzylphenyl phosphate having a structure corresponding to the formula:

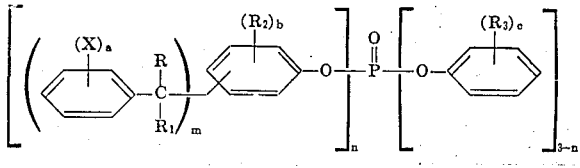

wherein $n$ is a number between 0.5 and 2 inclusive; $m$ is a number between 1 and 3 inclusive; X is a halogen selected from the group consisting of chlorine and bromine; R and $R_1$ are each selected from the group consisting of hydrogen and methyl; $R_2$ and $R_3$ are each lower alkyl having 1 to 8 carbon atoms; $a$ is a number between 1 and 5 inclusive; $b$ is a number between 0 and 4 inclusive; and $c$ is a number between 0 and 5 inclusive.

2. The halobenzylphenyl phosphates of claim 1 wherein R is hydrogen and $R_1$ is methyl.

3. The halobenzylphenyl phosphates of claim 1 wherein R and $R_1$ are both hydrogen.

4. Chlorobenzylphenyl diphenyl phosphate.

5. Dichlorobenzylphenyl diphenyl phosphate.

6. Pentachlorobenzylphenyl diphenyl phosphate.

7. α-methylchlorobenzylphenyl diphenyl phosphate.

8. Trichlorobenzylphenyl bis(isopropylphenyl) phosphate.

9. α-methylchlorobenzylphenyl bis(isopropylphenyl) phosphate.

10. bis(chlorobenzylphenyl) phenyl phosphate.

11. bis (dichlorobenzylphenyl) phenyl phosphate.

12. bis (pentachlorobenzylphenyl) phenyl phosphate.

13. bis (α-methylchlorobenzylphenyl) phenyl phosphate.

* * * * *

UNITED STATES PATENT AND TRADEMARK OFFICE
CERTIFICATE OF CORRECTION

PATENT NO. : 3,855,365
DATED : December 17, 1974
INVENTOR(S) : Edward D. Weil

It is certified that error appears in the above-identified patent and that said Letters Patent are hereby corrected as shown below:

Column 1, line 30, the number "2415;" should be deleted.

Column 2, line 2, the phrase "and d are numbers between" should be deleted.

Column 2, line 32, the number "26" should be -- 2-6 --.

Column 3, lines 21-24, the compounds recited therein have been improperly spaced. The compounds should read --α-methyl-4-chlorobenzylphenyl bis(4-isopropylphenyl) phosphate. The next compound should read --bis(α-methyl-4-chlorobenzylphenyl) 4-isopropylphenyl phosphate--.

Signed and Sealed this eleventh Day of May 1976

[SEAL]

Attest:

RUTH C. MASON
Attesting Officer

C. MARSHALL DANN
Commissioner of Patents and Trademarks